(No Model.)
C. F. HOLCK.
DRAFT EQUALIZER.
No. 405,476. Patented June 18, 1889.
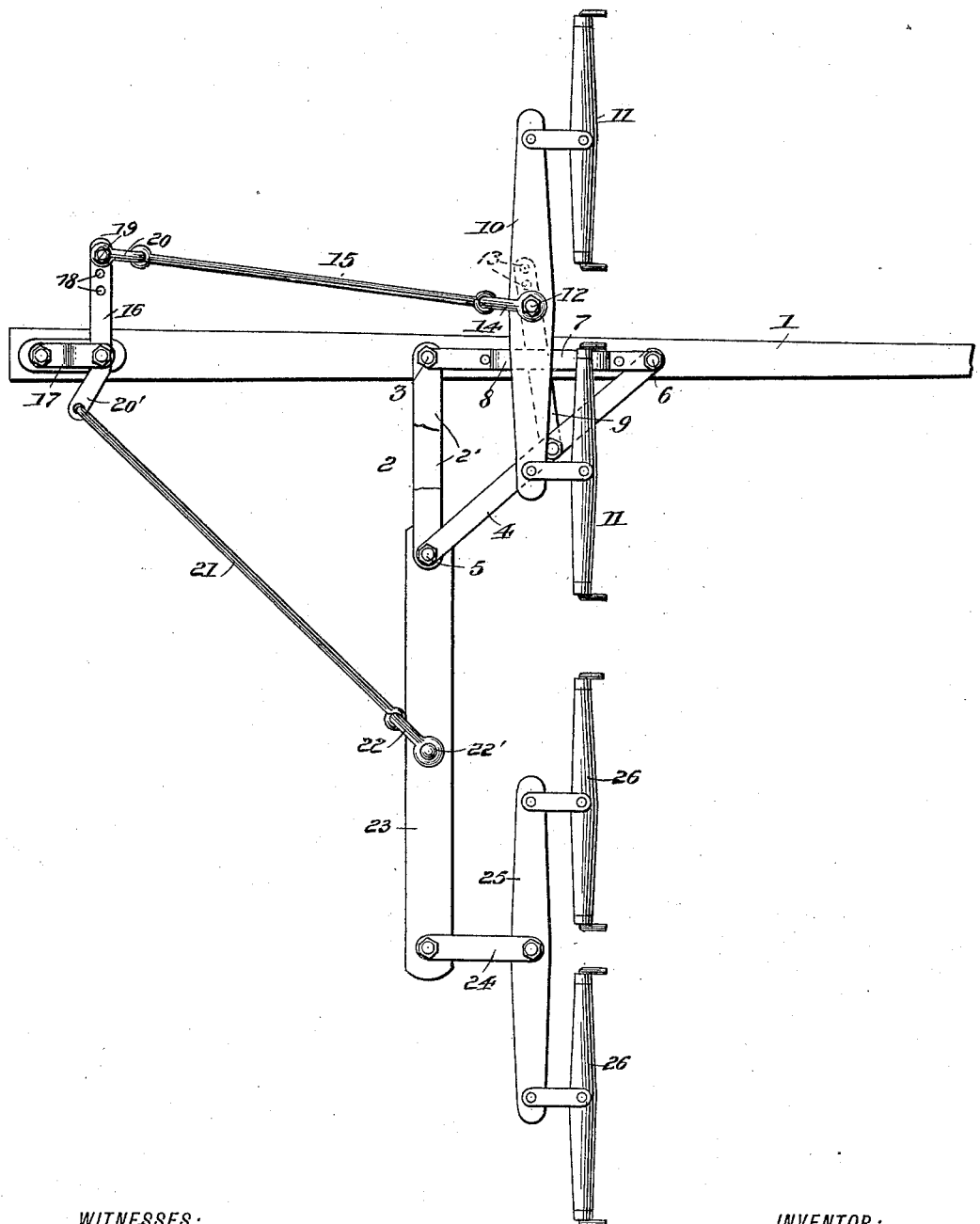
WITNESSES:
INVENTOR:
C. F. Holck
BY
Munn & Co.
ATTORNEYS.

UNITED STATES PATENT OFFICE.

CHARLES F. HOLCK, OF LAPORTE CITY, IOWA.

DRAFT-EQUALIZER.

SPECIFICATION forming part of Letters Patent No. 405,476, dated June 18, 1889.

Application filed December 4, 1888. Serial No. 292,604. (No model.)

*To all whom it may concern:*

Be it known that I, CHARLES F. HOLCK, of Laporte City, in the county of Black Hawk and State of Iowa, have invented a new and Improved Draft-Equalizer, of which the following is a full, clear, and exact description.

This invention relates to an improvement in draft-equalizers, and has for its object to provide a draft-equalizer to which four horses may be hitched, which will operate in an effective manner.

The invention consists in a draft-equalizer constructed and arranged as hereinafter described and claimed.

The figure of the accompanying drawing represents a plan view of my equalizer.

In the construction of this invention 1 indicates a tongue or pole, and 2 a triangular frame laterally extending from and rigidly secured to the pole 1 adjacent to its rear portion and consisting of double metallic bars 2', secured by bolt 3 to the upper and under sides of pole 1, and diagonal brace-bar 4, secured to outer end of bars 2' by bolt 5, and to pole 1 by bolt 6. A metallic strap 7, with raised bent portion 8, is secured to pole 1 and bolts 3 and 6. A metallic bar 9 is pivoted to diagonal brace-bar 4 and projects across the pole 1 beneath the raised portion 8 of strap 7. To the projecting end of bar 9 is pivoted a doubletree 10, having singletrees 11. The doubletree 10 is adjustably connected to bar 9 by means of a bolt 12 and a series of holes 13 in the end of bar 9. The bolt 12 passes through a clevis 14, flexibly connected by a rod 15 with one end of a cross-bar 16, pivoted beneath a hammer-strap 17 on the end of the pole 1. The end of rod 15 may be adjusted on the end of bar 16 by means of a series of holes 18 therein and a bolt 19 engaging a clevis 20. To permit of the draft being square, one end of bar 16 extends diagonally rearward, as at 20'. To the other end of bar 16 is loosely connected a rod 21, the other end of which is connected by a clevis 22 and bolt 22' with a bar 23, pivoted at one end to bolt 5, engaging bars 2', and at its outer end pivotally connected by double straps 24 with a doubletree 25, having the singletrees 26. By means of this construction and arrangement, as hereinbefore set forth, the draft of the horses secured to singletrees 11 and 26 will be equalized, the doubletree 10 being permitted to have a movement backward and forward on the end of bar 9, which is free to swing beneath the raised portion 8 of strap 7. The doubletree 25 is permitted to accommodate itself to the movement of doubletree 10 by means of pivoted double straps 24, pivoted bar 23, rod 21, cross-bar 16, and rod 15.

Having thus fully described my invention, I claim as new and desire to secure by Letters Patent—

1. A draft-equalizer consisting of a doubletree having singletrees, a bar pivoted at one end to a lateral frame on the pole and pivotally connected at its outer end to the doubletree, a cross-bar pivoted to the rear end of the pole and loosely connected at one end by a rod loosely connected at its other end to the bar pivoted to the lateral frame on the pole, and a doubletree with singletrees on the opposite side of the pole pivoted to the end of a bar extending across the pole and pivoted at its other end to the lateral frame, with a rod loosely connected at one end to the doubletree and at the other to one end of the cross-bar pivoted to the rear of the pole, substantially as shown and described.

2. A draft-equalizer consisting of doubletrees 10 and 25, with singletrees 11 and 26, respectively, on opposite sides of the pole, a triangular frame on one side of the pole consisting of double bars 2' and diagonal brace-bar 4, fastened to the pole, a strap 7, with upwardly-bent portion 8, secured to the pole between the ends of bars 2' and brace-bar 4, a swinging bar 9, pivoted at one end to brace-bar 4, extending beneath strap 7, and having adjustably secured to its other end by holes 13 and bolt 12 the doubletree 10, a bar 23, pivoted at one end to the outer end of bars 2', and pivotally connected by double straps 24 with doubletree 25, and cross-bar 16, adjustably connected at one end by means of holes 18, bolt 19, and clevis 20 with one end of a rod 15, the other end of which connects by a clevis 14 and bolt 12 with doubletree 10, and the other rearwardly-inclined end 20' of bar 16 connected to one end of a rod 21, the other end of which connects by clevis 22 and bolt 22' with doubletree 25, substantially as shown and described.

CHARLES F. HOLCK.

Witnesses:
W. A. KNOWLES,
I. JAMES.